United States Patent [19]

Katsuda

[11] 3,843,690
[45] Oct. 22, 1974

[54] CERTAIN SUBSTITUTED FURFURYLESTERS OF CHRYSANTHEMUMIC ACID

[75] Inventor: Yoshio Katsuda, Osaka, Japan

[73] Assignee: Dainippon Jochugiku Kabushiki Kaisha, Osaka, Japan

[22] Filed: Dec. 15, 1970

[21] Appl. No.: 98,468

Related U.S. Application Data

[63] Continuation-in-part of Ser. No. 629,422, April 10, 1967, abandoned.

[30] Foreign Application Priority Data
Aug. 24, 1966  Japan.............................. 41-55930
June 28, 1966  Japan.............................. 41-42289

[52] U.S. Cl............. 260/347.4, 260/347.8, 424/285
[51] Int. Cl............................................. C07d 5/16
[58] Field of Search ................................ 260/347.4

[56] References Cited
UNITED STATES PATENTS
3,465,007   9/1969   Elliot .............................. 260/347.4

Primary Examiner—Henry R. Jiles
Assistant Examiner—Bernard Dentz
Attorney, Agent, or Firm—Brisebois & Kruger

[57] ABSTRACT

The present invention relates to insecticide compositions containing the substituted furfurylesters of chrysanthemumic acid expressed by the following general formula

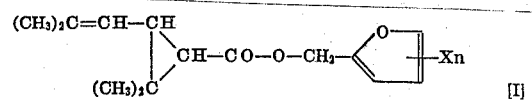

where X is a substituent selected from the group consisting of ethyl, allyl, isobutenyl, hexyl, ethoxy, pentoxy, allyloxy, chloro, bromo and nitro; $n$ is a whole number between 1 and 3 inclusive, to methods of manufacturing said esters to insecticides containing said esters as their active ingredient and to methods of killing noxious insects by means of such insecticides.

8 Claims, No Drawings

CERTAIN SUBSTITUTED FURFURYLESTERS OF CHRYSANTHEMUMIC ACID

This application is a continuation in part of application Ser. No. 629,422, filed Apr. 10, 1967 which has been abandoned.

SUMMARY OF THE INVENTION

Pyrethrins, which are the active ingredient of "insect powder" (pyrethrum) are highly valued throughout the world as very useful insecticides which have an unequaled rapid insecticidal effect on various species of noxious insects, but are innocuous to warm-blooded animals. Moreover, insects can develop resistance to them. In particular, they rank at the top of insecticides for environmental sanitation. However, since nature is relied upon as their sole source the supply is now insufficient to meet the demand.

Under these circumstances, studies of compounds analogous to pyrethrin have been vigorously prosecuted. As a result, many pyrethroids have been synthesized and tested, but the only such compound successfully developed for practical purposes is allethrin. Allethrin, however, is expensive to manufacture, and its insecticidal power is inferior to those of natural pyrethrins.

The present inventor in the course of his long years of investigations into the esters of chrysanthemumic acid, which are analogous to pyrethrins, has discovered that the substituted furfuryl esters of chrysanthemumic acid as expressed by the above-mentioned formula [I] possess an extremely strong insecticidal effect on insects, particularly on the family araeopidae, family jassidas, or family aphididae. For instance, 5-allyl-furfurylester of chrysanthemumic acid is 7.7 times stronger than allethrin in knock-down effect, and 5 times stronger than allethrin in lethal effect, on house flies. Meanwhile, the substituted furfurylester of chrysanthemumic acid has a generally high vapour pressure, and is easy to evaporate through heating, but less subject to thermo-decomposition, so that it is found to be very suitable for use as an active ingredient in insecticides for fumigating or for heating and evaporating use.

Moreover, the substituted furfurylester of chrysanthemumic acid expressed by the above-mentioned formula [I] can be easily produced by reacting chrysanthemumic acid or its functional derivative with substituted furfurylalcohol or its derivative. Thus, this invention is directed not only to the substituted furfurylesters of chrysanthemumic acid, as new compounds but also to methods of manufacturing them. It is also within the scope of this invention to utilize the substituted furfurylesters of chrysanthemumic acid as suitable active ingredients in spray-type insecticides or as suitable active ingredients in insecticides for fumigating or for heating and evaporating use. Still another objective of this invention is to provide insecticides for environmental sanitation and for agricultural and horicultural purposes which contain the above-mentioned esters as active ingredients, and which possess a strong, swift effect in destroying various noxious insects, but are innocuous to the warm-blooded animals and do not develop any resistance to said insecticides in these noxious insects. This invention also includes the method of destroying noxious insects which relies on the use of these compounds.

Other objectives and advantages of this invention will become apparent from the following description.

The substituted furfurylesters of chrysanthemumic acid of this invention as expressed by the above formula [I] can be manufactured by the following methods:

1. substituted furfurylalcohol as expressed by the following formula:

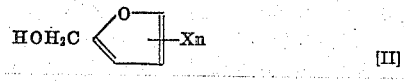

[II]

where X is a substituent selected from the group consisting of ethyl, allyl, isobutenyl, hexyl, ethoxy, pentoxy, allyloxy, chloro, bromo and nitro; and n is a whole number between 1 and 3 inclusive, with chrysanthemumic acid or its functional derivative. The above-mentioned substituted furfurylalcohol can be treated with an alkali metal such as sodium or potassium, and then, as alcoholate, may be reacted with the above-mentioned chrysanthemumic acid or its functional derivative.

2. Said substituted furfurylesters of chrysanthemumic acid can be obtained by treating the substituted furfuryl-alcohol of the above formula [II] with thionylchloride, phosphorus pentachloride, etc., and reacting the resultant substituted furfurylchloride with chrysanthemumic acid or its salts.

3. Said substituted furfurylester of chrysanthemumic acid can be obtained by reacting an ester of the substituted furfurylalcohol as expressed by the above formula [II] and an organic acid such as acetic acid or propionic acid with chrysanthemumic acid or its ester.

In the above-mentioned methods, the term "functional derivative of chrysanthemumic acid" refers to acid halides such as acid chlorides or acid bromides; acid anhydrides; esters such as methyl ester, ethyl ester, etc.; and salts such as alkali metal salts, silver salts, lead salts, etc. of chrysanthemumic acid; and the term "salts and esters of chrysanthemumic acid" refers to such salts and esters as mentioned above.

As examples of the substituted furfurylalcohols as expressed by the above formula [II], the following may be mentioned:

3-allyl furfuryl alcohol; 4-allyl furfuryl alcohol; 5-allyl furfuryl alcohol; 5-butenyl-furfuryl alcohol; 3-nitro-5-ethoxy furfuryl alcohol; 3,4-dichloro-5-allyloxy furfuryl alcohol; 4-hexyl-5-pentaoxy furfuryl-alcohol; 3,4-dimethyl-5-allyl furfuryl alcohol; 3,4-dichloro-5-ethyl furfuryl alcohol; 5-bromo-furfuryl alcohol, 5-ethoxy furfuryl alcohol; etc.

Typical examples of the substituted furfuryl esters of chrysanthemumic acid as expressed by the above formula [I] in this invention include:

3-allyl furfuryl ester of chrysanthemumic acid: bp 119–121°C/0.2mm Hg, 4-allyl furfuryl ester of chrysanthemumic acid: bp 129–130°C/0.3mm Hg, 5-allyl furfuryl ester of chrysanthemumic acid: bp 116–118°C/0.15mm Hg, 3-nitro-5-ethoxy furfuryl ester of chrysanthemumic acid: bp 155–158°C/0.4mm Hg, 3,4-dichloro-5-allyloxy furfuryl ester of chrysanthemumic acid: bp 150–158°C/0.5mm Hg, 3-bromo-5-isobutenyl furfuryl ester of chrysanthemumic acid: bp 155–163°C/0.7mm Hg, 4-hexyl-5-pentoxy furfuryl ester of chrysanthemumic acid: bp 160–170°C/0.2mm Hg, 3,4-dimethyl-5-allyl furfuryl ester of chrysanthemumic acid: bp 125–133°C/0.2mm Hg, 3,4-dichloro-5-ethyl furfuryl ester of chrysanthemumic acid: bp 120–128°C/0.3mm Hg, 5-bromo furfuryl ester of chrysanthemumic acid: bp 130–131°C/0.6mm Hg, 5-ethoxy furfuryl ester of chrysanthemumic acid: bp 125–132°C/0.35mm Hg, The above-mentioned substituted furfurylesters are, in general, soluble in organic solvents.

These compounds all have an excellent insecticidal action on insects, while they all have extremely low or have practically no toxicity to warm-blooded animals. For instance, the acute oral toxicity of 5-methyl furfuryl ester of chrysanthemumic acid to mice is over 10g/Kg, while that of 5-allyl furfuryl ester of chrysanthemumic acid is 9.69g/Kg; they are thus fully practical as insecticides or repellents to be added to foods.

These esters according to this invention, when practically employed as the active ingredients in insecticidal sprays, are usually blended with some suitable conventional inert carrier and may be used in the form of a powder, wettable powder, tablets, solution, emulsion, aerosol, etc.

For instance, these esters can be evenly mixed with granular inert carriers such as talc, clay, bentonite, kaolin, and diatomaceous earth, and made into a wettable powder.

Or they may be mixed with both the above-mentioned granular inert carriers and with surface-active agents; and then kneaded and crushed into a wettable powder.

They may also be diluted with the above-mentioned inert carriers mixed with starch, sodium alginate, or natural binders such as CMC or PVA; and then stamped into tablets. Adequate quantities of these esters may also be dissolved in such solvents as kerosene to form solutions. These esters may likewise be dissolved in such solvents as xylole, benzene, etc., mixed with a surface-active agent, and made into emulsions.

In addition, they may be dissolved with other insecticides, adjuvants, perfumes, etc. in kerosene, and the resulting aerosol may be compressed within a pressure vessel and sealed therein together with such propellants as freon, vinylchloride, LPG, etc. so as to produce aerosol preparations.

When these esters are to be employed as insecticides for fumigation, they can be mixed with some appropriate base such as powdered wood and used in the form of mosquito incense sticks. If they are to be used as insecticides for heating and evaporating use, they are dissolved in, say, white kerosene, and the resulting solution is continuously fed onto the evaporating surface of an electric heater or said solution is absorbed into a carrier consisting of a noninflammable material such as asbestos and the resulting product heated on an electric heater.

The concentration of these esters in the insecticides according to this invention depends on the form of preparation, the manner of use, the objective of use, etc. The preferred range of concentration would be 0.05 – 60 percent. However, their concentration is not necessarily limited to this range, but may be varied over a wider range. For long time use, a low concentration is preferred, while for short time use a high concentration may be possible.

Moreover, these esters of chrysanthemumic acid can have their insecticidal effect strengthened by mixing them with such synergists as N-octylbicycloheptenedicarboxyimide (trade-name: MGK-264), a mixture of N-octylbicycloheptene dicarboxyimide and isopropylamine salt of dodecyl benzene sulfonic acid (tradename: MGK-5026), octachlorodipropylether, piperonylbutoxide, etc.

Some actual examples of the synthesis of the substituted furfurylesters of chrysanthemumic acid according to this invention will now be given:

EXAMPLE 1

2.2g of 5-allylfurfurylalcohol is dissolved in 15 ml of dry benzene and the resulting substance is mixed with 3g of chrysanthemumic acid chloride dissolved in dry benzene, and with 2 ml of dry pyridine as a condensation agent. This procedure yields crystals of pyridine hydrochloride. These crystals are sealed up and left at room temperature overnight, and the pyridine hydrochloride is then separated by filtering. The benzene solution is then washed successively with aqueous sodium bicarbonate, dilute hydrochloric acid and water. When this benzene solution is dried and then condensed in a nitrogen flow under lowered pressure at a low temperature (below 50°C of bath temperature), 4g of viscous, transparent 5-allylfurfurylester of chrysanthemumic acid is obtained. The yield is almost constant, boiling point being 129–130°C/0.35mm Hg, $n_D^{25}$ : 1.4948.

EXAMPLE 2

2g of 5-bromofurfurylalcohol and 25g of chrysanthemumic acid chloride are reacted together in the same way as in Example 1, yielding 3.2g of 5-bromofurfurylester of chrysanthemumic acid. Bp: 130°C/0.6mm Hg; $n_D^{25}$ : 1.5133.

EXAMPLE 3

An equal number of mols of 5-allylfurfurylalcohol and ethylester of chrysanthemumic acid are heated to 150°C. When the temperature rises to 150°C, 0.25g of sodium is added and the distillation of ethyl alcohol is started. When ethanol ceases to be distilled, 0.25g more of sodium is added and the temperature is maintained at 150–180°C until the theoretical quantity of ethanol is secured. This process is repeated. Next, the mixture is cooled and dissolved in ether. The ether solution is washed with dilute hydrochloric acid, aqueous sodium bicarbonate and aqueous sodium chloride, and then dried using Glauber's salt. Finally the ether is distilled away, producing a viscous, transparent 5-allylfurfurylester of chrysanthemumic acid, the yield being about 60 percent.

EXAMPLE 4

Through Williamson's reaction, sodium chrysanthemumate is suspended in a naphtha solution, and the suspension is mixed at about 150°C with 5-allylfurfurylchloride, over a period of more than about 30 minutes. The reaction product is distilled under reduced pressure to remove the naphtha, and yields 5-allylfurfurylester of chrysanthemumic acid.

EXAMPLE 5

4g of chrysanthemumic acid, 10 g of 5-allylfurfurylalcohol and 150 cc of benzene are mixed. The mixture is mixed during violent agitation with 2cc of concentrated sulphuric acid. While still under agitation it is reflux-heated and the water generated through azeotrope is eliminated by a dehydrating agent. Benzene is occasionally replenished. After the solvent is distilled out of the residue, the residue is distilled under reduced pressure, yielding 5-allylfurfurylester of chrysanthemumic acid.

Some actual examples of insecticides containing as their active ingredient a substituted furfurylester of chrysanthemumic acid according to this invention follow.

EXAMPLE 6

A thermometer, a reflux-condenser and a tube for introducing nitrogen are attached to a 100 ml round-bottomed flask, into which 6g of 5-methylfurfurylacetate and 5g of chrysanthemumic acid are poured and thoroughly mixed for 30 minutes. Next, 0.15 ml of concentrated sulphuric acid is dropped into the mixture. The mixture is refluxed for three hours, and sodium acetate is added to neutralize the sulphuric acid. It is then dissolved in ether. The resulting ether solution is successively washed with dilute hydrochloric acid, aqueous sodium carbonate and aqueous sodium chloride, then dried using Glauber's salt, and after the ether is distilled away, the solution is distilled under reduced pressure, producing 5-methylfurfurylester of chrysanthemumic acid. The yield is about 40 percent.

EXAMPLE 7

0.2g of 3-bromo-5-isobutenylfurfurylester is dissolved in sufficient white kerosene to form 100 ml of solution and from this, a 0.2 percent oil preparation is produced.

EXAMPLE 8

0.3g of 3,4-dimethyl-5-allylfurfurylester of chrysanthemumic acid and 0.9g of piperonyl butoxide are dissolved in sufficient white kerosene to form 100 ml of solution and from this, an oil preparation is produced.

EXAMPLE 9

20g of 5-allylfurfurylester of chrysanthemumic acid is dissolved in a small quantity of xylole, mixed with 5g of emulsifier, and then mixed with xylole to produce a total volume of 100 ml, from which a 20 percent emulsion is obtained.

EXAMPLE 10

15g of 5-methylfurfurylester, 80 percent of a mixture of diatomaceous earth and kaolin, and 5g of a wetting agent are mixed and crushed, yielding a 15 percent wettable preparation.

EXAMPLE 11

3g of 5-allylfurfurylester of chrysanthemumic acid and 97g of a mixture of diatomaceous earth and kaolin are blended and crushed into a 3 percent powder preparation.

EXAMPLE 12

0.3g of 5-allylfurfurylester of chrysanthemumic acid, 0.3g of allethrin and 1.5g of octachlorodipropylether are dissolved in sufficient white kerosene to produce 100 ml of the solution, 90ml of which is compressed in a pressure vessel, into which 210 ml of a mixture of dichlorodifluoromethane as a cooling medium, and vinyl chloride and LPG, as a propellant is sealed. Then by attaching a jet-valve to the vessel, an aerosol preparation is obtained.

EXAMPLE 13

0.7g of 5-allylfurfurylester of chrysanthemumic acid, and 1.0g of MGK 5026 are evenly blended with 98.3g of such basic ingredients of mosquito incense sticks as pyrethrum extract powder, powdered wood, starch, etc. The resulting substance is molded into mosquito sticks containing 0.7 percent active ingredient by a publicly-known process.

EXAMPLE 14

0.7g of 3-allylfurfurylester of chrysanthemumic acid and 1.0g of MGK-5026 are evenly blended with 98.3g of the basic ingredients of mosquito incense sticks such as pyrethrum extract powder, powdered wood, starch, etc. The resulting substance is molded into mosquito incense sticks containing 0.7 percent active ingredient in a conventional manner.

EXAMPLE 15

Mosquito incense sticks are prepared comprising 0.3g of allethrin, 0.4g of 5-methylfurfurylester of chrysanthemumic acid and 99.3g of conventional basic ingredients for mosquito incense sticks.

The results of tests of the insecticidal effect of the substituted furfurylesters of chrysanthemumic acid of this invention are given below:

1. Spraying test.

The relative effectiveness values of a 3 percent white kerosene solution of a furfurylester of chrysanthemumic acid (A — control) and 0.2 percent white kerosene solutions respectively of 5-methylfurfurylester of chrysanthemumic acid (B), 5-ethoxyfurfurylester of chrysanthemumic acid (C) and 5-allylfurfurylester of chrysanthemumic acid (D) were estimated from the knockdown rate of house flies in accordance with a modified Campbell and Sullivan's metal turntable method, with the following results:

| Test preparations | Probit 4 | Probit 5 | Probit 6 |
|---|---|---|---|
| A | 1.00 | 1.00 | 1.00 |
| B | 2.02 | 2.14 | 2.30 |
| C | 1.88 | 1.96 | 2.08 |
| D | 8.04 | 8.84 | 9.35 |

From these results, it is found that whereas the substituted furfurylesters of chrysanthemumic acid as oil preparations (B, C, and D) were only 1/15 as concentrated as the furfurylester of chrysanthemumic acid (A) with no substituent, the toxic effect of the former was over two times greater than that of the latter.

Moreover, 5-allylfurfurylester of chrysanthemumic acid with an alkenyl radical as substituent was found to be stronger in its effect than furfurylesters of chrysanthemumic acid with other substituents.

2. Fumigation test

A mosquito incense stick (A — control) with 3 percent furfurylester of chrysanthemumic acid as the insecticidal ingredient and four other mosquito incense sticks containing respectively, 0.5 percent of 5-methylfurfurylester of chrysanthemumic acid (B), 3,4-dichloro-5-ethylfurfurylester of chrysanthemumic acid (C), 4-allylfurfurylester of chrysanthemumic acid (D), 5-allylfurfurylester of chrysanthemumic acid (E), 5-bromofurfurylester of chrysanthemumic acid (F) and allethrin (G) were prepared and tested for the knockdown rate of full-grown red house mosquitoes. These tests were conducted in accordance with the procedure described by Nagasawa, Katsuda and others on page 176 of "Bochu-Kagaku" Vol. 16 (1951). A glass cylinder, inner diameter 20 cm, height 43 cm, having top and bottom glass disks, diameter 27cm, with a rubber packing in between was mounted on a supporting table. Through a round hole of 5cm diameter bored at the center of the bottom disk, 20 test insects (Culex pipiens pallens Coquillett or chika red house mosquito, female, grown) were introduced. A test incense stick which had been igntited at one end and reached its normal smoking state after more than two minutes of burning was set on a stickstand and introduced into said cylinder. The hole was sealed with a cork plug; the stick was allowed to smoke for one minute, after which it was swiftly taken out of the cylinder. The knockdown rate of mosquitoes was counted at 25°C ±2°C from the moment of incense stick introduction. This test was repeated 4 to 5 times with each kind of stick. The effectiveness value was estimated using the Bliss probit conversion method, with the following results:

| Test sticks | Probit 4 | Probit 5 | Probit 6 |
|---|---|---|---|
| A | 1.00 | 1.00 | 1.00 |
| B | 4.08 | 4.17 | 4.31 |
| C | 1.01 | 1.10 | 1.21 |
| D | 4.62 | 4.95 | 5.41 |
| E | 8.09 | 8.13 | 8.18 |
| F | 0.68 | 0.70 | 0.72 |
| G | 4.65 | 4.58 | 4.53 |

3. Heating and evaporating test

In this test, the following insect-killing device, insecticidal ingredients and test procedures were employed:

Insect-killing device:
The type of device in which a 3 percent white kerosene solution of the insecticidal ingredient was heated to evaporate over an electric heater.

Insecticidal ingredients:
Allethrin (A — Control)
5-allylfurfurylester of chrysanthemumic acid (B)
5-methylfurfurylester of chrysanthemumic acid (C)

Test procedure:
A glass cylinder, diameter 27cm, with a central hole, diameter 5cm, was set on a supporting table. On top of this cylinder, additional glass cylinders 20cm in diameter and 43cm in height were piled up in two layers. Then, another cylinder, 20cm in diameter and 20cm in height, into which adult red house mosquitoes (culex pipens pallens) had been released was placed, with top and bottom covered with 12-mesh insect-proof screening, on top of entire group of cylinders. Then the top was covered with a piece of saran cloth and over it, still another cylinder of the same dimensions was placed, and likewise covered with saran cloth.

Through the central hole of the bottom-most cylinder, said insect-killing device was introduced. Then the knock-down rate of adult red house mosquitoes was counted at certain intervals and the relative effectiveness value was estimated:

The results were as follows:

| Test preparations | Probit 4 | Probit 5 | Probit 6 |
|---|---|---|---|
| A | 1.00 | 1.00 | 1.00 |
| B | 2.21 | 2.86 | 3.80 |
| C | 1.18 | 1.55 | 2.18 |

The substituted furfurylesters of chrysanthemumic acid as represented by the formula [I] in this invention all have a higher vapor pressure than the conventional pyrethroids and can be easily evaporated by heating. Therefore, these esters are less subject to pyrolysis when evaporating during fumigation or during heating. Accordingly they are released into the air in extremely large quantities. For this reason, they are expected to be remarkably effective in use as insecticidal ingredients for fumigating type insecticides such as mosquito incense sticks or for use in electrically heated types of insect-killing devices.

The conventional pyrethroids such as natural pyrethrin and allethrin, when used as the active ingredient in mosquito incense sticks or in electrically heated types of insect-killing devices are released into the air at a rate of only 15 percent. On the other hand, it was found, as the result of preparing mosquito incense sticks using the esters of this invention by the traditional method, burning them and making a quantitative analysis of the active ingredient in the emitted smoke, that the active ingredient was released into the air at a rate of 30–40 percent. When the same active ingredient was impregnated into a paper board or molded after absorbed on an appropriate extender or floated on a solvent to be heated and evaporated over an appropriate electric heater, the same excellent rate of evaporation as in the case of the above-mentioned mosquito incense stick was also obtained.

What is claimed is:

1. A substituted furfurylester of chrysanthemumic acid represented by the following formula:

$$(CH_3)_2C=CH-CH\underset{(CH_3)_2C}{\overset{}{\diagdown}}CH-CO-O-CH_2-\underset{}{\diagup\!\!\!\!O\diagdown}-X_n$$

in which X is a substituent selected from the group consisting of ethoxy, pentaoxy, allyloxy, chloro, bromo and nitro, while $n$ is a whole number between 1 and 3 inclusive.

2. 3-nitro-5-ethoxyfurfurylester of chrysanthemumic acid.

3. 3,4-dichloro-5-allyloxyfurfurylester of chrysanthemumic acid.

4. 3-bromo-5-isobutenylfurfurylester of chrysanthemumic acid.

5. 4-hexyl-5-pentoxyfurfurylester of chrysanthemumic acid.

6. 3,4-dichloro-5-ethylfurfurylester of chrysanthemumic acid.

7. 5-bromofurfurylester of chrysanthemumic acid.

8. 5-ethoxyfurfurylester of chrysanthemumic acid.

* * * * *